United States Patent [19]

Patterson

[11] 4,140,441
[45] Feb. 20, 1979

[54] TURBOMOLECULAR PUMP LUBRICATION SYSTEM

[76] Inventor: Williams G. Patterson, 3571 South Ct., Palo Alto, Calif. 94306

[21] Appl. No.: 786,580

[22] Filed: Apr. 11, 1977

[51] Int. Cl.$^2$ ............................................. F04B 17/00
[52] U.S. Cl. .................................... 417/424; 184/6.18; 417/372; 415/112
[58] Field of Search ...................... 417/372, 424, 902; 415/110, 111, 112; 184/6.18

[56] References Cited

U.S. PATENT DOCUMENTS

| | | | |
|---|---|---|---|
| 1,921,842 | 8/1933 | Rushton | 184/6.18 |
| 1,964,415 | 6/1934 | Vandeventer | 417/902 |
| 2,062,920 | 12/1936 | Mapes et al. | 417/372 |
| 2,117,468 | 5/1938 | Wolcott | 417/372 |
| 2,423,719 | 7/1947 | Muffly | 417/372 |
| 2,738,122 | 3/1956 | Gardiner | 417/902 |
| 2,835,437 | 5/1958 | Boynton | 417/902 |
| 3,311,292 | 3/1967 | Connor | 417/372 |
| 3,334,808 | 8/1967 | Parker et al. | 417/902 |
| 3,767,013 | 10/1973 | Caldwell | 184/6.18 |
| 3,877,546 | 4/1975 | Shrader | 184/6.18 |

*Primary Examiner*—C. J. Husar
*Attorney, Agent, or Firm*—C. Michael Zimmerman

[57] ABSTRACT

A high vacuum turbomolecular pump is described having a lubrication system which assures steady, continuous lubrication of the rotor bearings. The pump includes an outer casing having an upper open end adapted to be communicated hermetically with an isolated environment to be pumped, and an exhaust opening at its lower end. A plurality of vertically spaced stator blade wheels are positioned within the casing intermediate the inlet and exhaust openings, and a rotor is mounted within the casing on a spindle for rotation therewith on a generally vertical axis. The rotor is provided with a plurality of axially spaced rotor blade wheels interleaved with the stator blade wheels. An electrical induction motor is incorporated within the pump for rotating the spindle and, hence, the pump rotor, for high vacuum pumping. Such spindle is supported for rotation by a pair of bearings positioned on opposite sides of the induction motor and has an axial passageway designed to draw fluid lubricant upwardly therealong by centrifugal action during its rotation. The lower end of the spindle extends into a reservoir of fluid lubricant. A cup surrounds the spindle lower end to isolate the exterior of the spindle from lubricant within the reservoir, and a nozzle communicating with the reservoir extends into the inlet orifice of the passageway to feed fluid lubricant into the same without such lubricant having to contact the external rotating surfaces of the spindle.

8 Claims, 2 Drawing Figures

TURBOMOLECULAR PUMP LUBRICATION SYSTEM

BACKGROUND OF THE INVENTION

The present invention relates to high vacuum turbomolecular pumps and, more particularly, to such a pump having an improved lubrication arrangement for its rotor bearings.

Turbomolecular pumps are increasingly being used to pump in the free molecule pressure range, i.e., $10^{-3}$ to $10^{-10}$ torr, because they are inherently non-contaminating. They operate on kinetic gas principles and rely on the relative motion between gas molecules and an interleaved cascade of stator and rotor blade wheels upon which they impact. The design of the blade wheels makes it more probable that a molecule striking the same will rebound toward the pump outlet than toward its inlet.

In general the pumping speed and efficiency of a turbomolecular pump is dependent upon the speed of rotation of the rotor blades. For this reason, rotor speeds in the high range of 35,000 to 50,000 r.p.m. are not unusual. Such high rotational speeds place relatively stringent structural limits and lubrication demands on the rotor. To assure balanced rotation, the rotors of most modern pumps are arranged to rotate on a vertical axis, and the motor responsible for such high rotation typically is an induction-type motor incorporated directly into the pump with the motor rotor output shaft also serving as the axle or, in other words, spindle for the pump rotor.

It will be appreciated that with such high speed operation, the amount and type of lubrication of the bearings supporting the spindle and, hence, supporting the turbine rotor can measurably affect the efficiency of the pump. In this connection, because the motor typically operates in a reduced pressure atmosphere, the amount of heat generated by the same must be kept at a minimum by optimizing the efficiency of its operation, e.g., reducing bearing drag, etc.

U.S. Pat. No. 3,877,546 describes a typical lubrication system for a turbomolecular pump having a rotor which rotates on a vertical axis. As illustrated therein, the pump is provided at its bottom with a reservoir of lubricating oil within which the lower end of the rotor spindle is immersed. An axial passageway extends upwardly through the spindle from such lower end to a location adjacent (slightly above) an upper bearing supporting the spindle for rotation. On rotation of the spindle, oil from the reservoir is drawn centrifugally up the passageway and is directed by radial outlets at the top of the spindle to the upper bearing for lubricating the same. A lower bearing for the spindle is lubricated by collecting the oil flowing downwardly from the upper bearing and feeding the same to the lower bearing prior to such oil being returned to the reservoir.

While lubrication systems of the general type described are considered the most acceptable by many, there are difficulties associated with the same, particularly at the immersed lower end of the spindle. For one, as the spindle rotates at a high r.p.m., it causes turbulence within the reservoir at the inlet orifice to the spindle, which turbulence prevents a continuous controlled flow into the spindle shaft. This problem is compounded by operation at the reduced atmospheric pressure levels typical of the reservoir section of turbomolecular pumps. When the vacuum level in such section approaches the vapor pressure of the lubricant, adverse velocity and pressure gradients caused by the turbulence can cause cavitation (local vaporization) of the oil. This can cause either intermittent or continuous stoppage of oil flow into the shaft, depending on factors such as the shaft speed, oil properties, vacuum level, etc.

In an effort to reduce the affect of turbulence on the entry of oil into the shaft passageway, it has been the practice to reduce the shaft surface area immediately adjacent the passageway orifice. That is, the end of the shaft is typically machined or otherwise reduced in diameter, often to be a knife edge in cross section at the inlet orifice. While such a geometrical configuration tends to reduce the problems of turbulence immediately adjacent the inlet orifice, it does not eliminate the same, nor assure a continuous, controlled amount of flow into the passageway.

Another problem associated with immersion of the lower end of the spindle is that as the spindle rotates frictional drag caused by the lubricant results in shaft power loss. This power loss appears as heat generation in the motor which, as mentioned previously, should be avoided.

SUMMARY OF THE INVENTION

The present invention is a high vacuum turbomolecular pump having a lubrication arrangement which has a vertical passageway through the rotor spindle for lubricant distribution, but which is not subject to the discontinuous flow or drag losses normally associated with such a construction. In its basic aspects, the pump of the invention includes, as is usual, an outer casing having an inlet opening for communication with the environment to be pumped, and an exhaust opening spaced vertically from such inlet opening; a rotor mounted for rotation with a spindle in the casing on a generally vertical axis, which rotor has a plurality of axially spaced rotor blade wheels interleaved with vertically spaced stator blade wheels of the casing; and drive means for rotating the spindle and turbine rotor about the vertical axis. The spindle is supported for rotation by at least one bearing spaced upwardly from its lower end, and has an axial passageway for drawing fluid lubricant upwardly therealong upon rotation of the spindle. An outlet from the axial passageway is positioned to direct lubricant from a reservoir to the bearing.

As a particularly salient feature of the invention, a stationary nozzle is included communicating with the reservoir and extending into the inlet orifice of the spindle passageway to feed lubricant to it without such lubricant having to contact external rotating surfaces of the spindle. Because of this construction, lubricant fed into the spindle passageway is not deleteriously affected by turbulence or the like caused by the external rotating surfaces of the spindle. Most desirably, the reservoir surrounds the lower end of the spindle, but means are included for isolating the lower end of such spindle from the lubricant within the reservoir during spindle rotation. Viscous drag on the lower end of the spindle is thereby eliminated and there is no turbulence created within the reservoir.

The invention includes other features and advantages which will be described or will become apparent from the following more detailed description of a preferred embodiment.

BRIEF DESCRIPTION OF THE DRAWINGS

With reference to the accompanying sheet of drawing.

DETAILED DESCRIPTION OF THE PREFERRED EMBODIMENT

Figure 1:
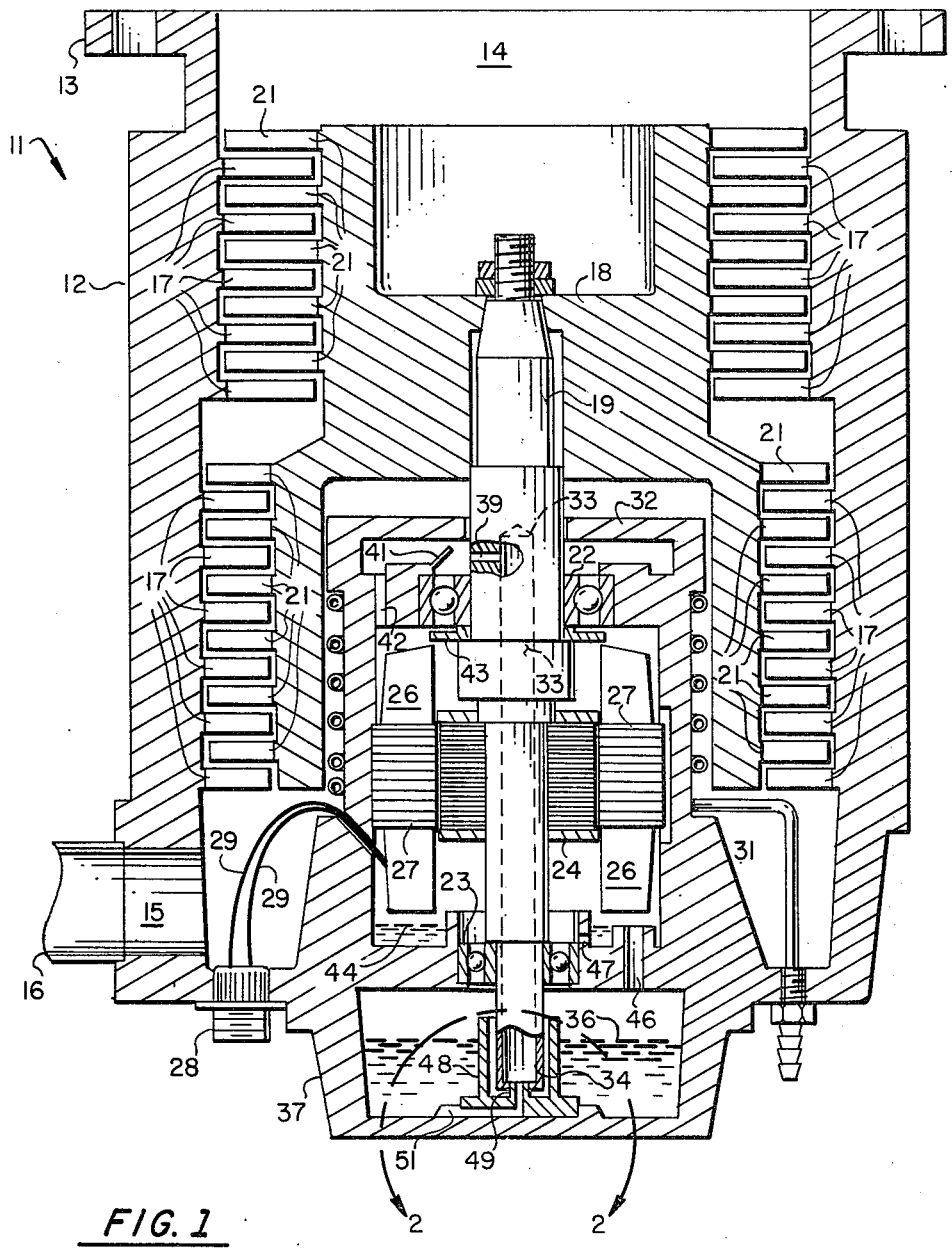
FIG. 1 is a somewhat schematic, sectional view of a turbomolecular pump of the invention incorporating the lubrication system.
Figure 2:
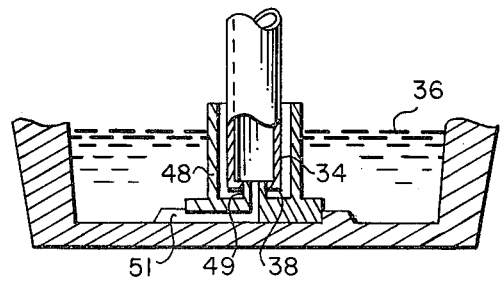
FIG. 2 is an enlarged sectional view of that portion of the pump of FIG. 1 encircled by the line 2—2.

With reference to FIG. 1, a turbomolecular pump 11 incorporating the invention is illustrated schematically, except for those aspects of the same relating to the inventive features. Such features are illustrated in detail. The pump includes an outer tubular casing 12 having a high vacuum flange 13 circumscribing its upper end for hermetic connection about an opening into a vacuum chamber or other isolated environment to be pumped. The open end 14 of the casing thus acts as an inlet opening for the pump. An exhaust opening 15 is shown connected to a vacuum pipe 16 leading to, for example, a mechanical roughing pump. Exhaust opening 15 is adjacent the lower end of the casing, i.e., spaced vertically from inlet opening 14.

In accordance with conventional turbomolecular pump design, a plurality of vertically spaced stator blade wheels 17 disposed between the inlet and exhaust openings project circumferentially inward from the inner wall of the casing 12. While such blade wheels are schematically illustrated as being integral with the casing wall, it will be appreciated that in most turbomolecular pumps they are provided as separate parts which are spaced from one another by, for example, spacer rings.

The pump 11 further includes a rotor 18 mounted on a spindle 19 for rotation on a generally vertical axis. Rotor 18 has a plurality of axially spaced rotor blade wheels 21 interleaved with the stator blade wheels 17. The shaft is journalled for rotation on a pair of spaced ball bearings 22 and 23.

As mentioned previously, upon high speed rotation of the rotor, e.g., 10,000–50,000 r.p.m., the rotor blade wheels and the stator blade wheels will cause high vacuum pumping in the free molecular pressure range. In this connection, the design of the blades of the stator and rotor wheels can be optimized for a desired pumping speed or pressure ratio (or compromise between the two) in accordance with the design criteria set forth in the paper entitled "Vacuum Pumping with a Bladed Axial-Flow Turbomachine" by Kruger et al, appearing in the *Seventh National Symposium of Vacuum Technology Transations* of the American Vacuum Society, Inc., Pergamon Press (1961).

The drive means for rotating the spindle and, hence, the turbine rotor at the high rate of revolution required, is an electrical induction motor incorporated directly into the pump. Such induction motor comprises a squirrel cage rotor 24 pressfit or otherwise rigidly secured to the spindle 19 at a location between the bearings 22 and 23, and a stator made up of poles 27 and windings 26 spaced outwardly of the rotor circumferentially surrounding the same. Electrical power is fed to the stator windings via an electrical socket 28 connected to the same by conductors 29. A cooling system including coolant flow coils 31 is wrapped around the housing 32 supporting the motor stator, in order to dissipate heat generated thereby. Such housing is secured to the pump casing 12 to be maintained stationary.

The lubrication system for the bearings 22 and 23 includes an axial passageway 33 which extends upwardly through spindle 19 from its lower end 34 to a position above the upper bearing 22. Its lower end 34 extends below the surface of a lubricant fluid (represented at 36) within a reservoir 37 provided at the bottom of the pump housing 12.

Passageway 33 is designed to cause fluid lubricant entering its lower end 34 to travel upwardly therealong upon high speed rotation of the spindle. That is, the lower end of the spindle includes an inwardly extending flange 38 defining a circumferential shoulder at such lower end providing support adjacent the walls of the passageway for any fluid lubricant therein. Upon rotation of the spindle at the high revolutions which are required for efficient turbomolecular pumping, fluid continuously fed into the passageway 33 by the head of fluid pressure within reservoir 37 will be forced by centrifugal action against the wall of the tube and tend to climb the same as additional fluid is introduced into such tube.

Passageway 33 has an outlet positioned to direct lubricant to the bearing 22. More particularly, one or more outlet bores 39 extends radially outward from the passageway 33 at a location above the bearing 22. Upon rotation of the spindle, lubricant at the bore 39 will be ejected from the spindle passageway. Such lubricant exiting the shaft will form, in effect, an annular disc of lubricant above the bearing 22. A tang 41 extends upwardly from the wall of the housing 32 to intercept a portion of the lubricant in such annular disc and direct the same toward the bearing 22. The lubricant will thus seep continuously downward to the outer ring of ball bearing 22 and into its race to provide lubrication of the same. Vertical passageways, such as the passageway 42, are provided to permit lubricant not intercepted by the tang 41 to bypass the bearing 22 and flow downwardly into the spaces surrounding the stator of the drive motor.

Means are provided to assure that lubricant flowing into the motor space does not cause undesirable drag and power losses. More particularly, an annular shield 43 is provided circumscribing the spindle and projecting radially outward from the same at a location between the bearing 22 and the motor. The purpose of such shield is to intercept lubricant flowing downward from the bearing and divert the same from the motor rotor. In this connection, it should be noted that it extends radially outward a greater distance from the spindle than the air gap between the rotor and stator to thereby prevent lubricant from entering the same, even at low speeds of rotation of the rotor.

It should be noted that the shielding function provided by the radially extending shield 43 when the rotor is rotating at a high speed of rotation is not only due to a physical obstruction between the bearing and the motor, but is also due to centrifugal force. That is, the shield is secured to the spindle to rotate therewith, and any lubricant from the bearing 22 which impinges on the upper surface of the same will be flung outwardly away from the portion of the motor it is designed to protect.

Passages (not shown) are provided as is conventional for allowing downward flow by gravity of the lubricant past the motor. Means are included for intercepting the downward flow of such lubricant prior to the same reaching the reservoir, and directing the same to the bearing 23 for lubrication thereof. That is, the lower portion of the housing structure 32 for the motor defines a cavity 44 within which the lubricant is captured. Such lubricant rises to the level of the inlet of a spillway outlet 46 which returns excess lubricant to the reservoir 37. A metering orifice 47 extends from the cavity 44 to a location immediately above the bearing 23 for directing lubricant within such cavity to such bearing for continuously lubricating the same. Lubricant exiting the bearing is allowed to flow into reservoir 37.

As previously mentioned, difficulty has been experienced in this type of lubrication system with the manner in which lubricant has been introduced into the spindle axial passageway. More particularly, the lower end of the rotor spindle is typically immersed within the reservoir for such introduction, and the turbulence about the oil inlet caused by rotation of the same interrupts, and sometimes completely stops, the flow of lubricant into such passageway. This can result in non-uniform lubrication of the bearings with consequent variations in drag, efficiency, etc.

As a particularly salient feature of the instant invention, it includes an arrangement which eliminates this problem. To this end, the lubrication arrangement of the pump includes a nozzle communicating with the reservoir 37 which extends into the inlet orifice at the lower end of the passageway to feed fluid lubricant thereinto without such lubricant having to contact external rotating surfaces of the spindle. Moreover, means are included isolating the exterior of the spindle adjacent its lower end from lubricant within the reservoir during spindle rotation. More particularly, a cylindrically shaped cup 48 surrounds the lower end of the spindle in spaced relationship thereto and extends to a level above the normal surface level 36 of the fluid lubricant within the reservoir. Extending upward from the bottom of the cup into the inlet orifice of the passageway is a tube 49 providing, in effect, the aforesaid nozzle.

As illustrated, tube 49 communicates through a passage 51 beneath the cup with the reservoir 37 adjacent its bottom, i.e., below the normal surface level of lubricant therein. This arrangement provides communication of the passageway within the spindle with lubricant under the pressure head developed within the reservoir without such lubricant having to contact the rotating spindle prior to the same entering into the passageway. In this connection, it is to be noted that the outer wall of the tube 49 is spaced radially inwardly slightly from the inner peripheral edge of the flange 38 so that it does not interefere with free rotation of the spindle.

This injection of lubricant directly into the spindle passageway assures that continuous flow thereof is not interrupted by turbulence or cavitation. Moreover, the elimination of contact by the entering fluid with the external surfaces of the spindle, relieves the relatively stringent geometrical constraints which in the past have had to be imposed on the spindle end construction in order to assure lubricant flow. In fact, it is only because of this direct introduction of liquid into the spindle passageway that a simple flange (flange 38) at the inlet end can be provided to support liquid for travel upwardly of the passageway, rather than a more costly construction such as the interior tapering included in the previously mentioned U.S. Pat. No. 3,877,546.

It will be noted that the cup 48 extends upwardly to a level above the normal surface level 36 of fluid lubricant within the reservoir. Moreover, the only communication which the interior of such cup has with lubricant is through passageway 51 and tube 49, and then through the slight space between the tube 49 and the rotating flange 38 of the spindle. Because of such construction, the cup provides essentially complete isolation of the rotating spindle from the lubricant during its rotation. That is, although the cup will normally fill with lubricant to the level 36 while the spindle is stationary, rotation of such spindle at high speed will cause sufficient turbulence and velocity of lubricant within the cup to cause ejection of the same, so that during continued rotation the lower end of the spindle will not be subject to viscous drag and consequent power losses.

Although the invention has been described in connection with a preferred embodiment thereof, it will be appreciated by those skilled in the art that various changes can be made without departing from the spirit of the same. For example, radial outlet holes can be provided anywhere along the length of the spindle to permit lubricant to exit the passageway for other components. It is therefore intended that the coverage afforded applicant be limited only by the spirit of the invention as encompassed by the claims and their equivalent language.

I claim:

1. A high vacuum turbomolecular pump comprising an outer casing having an inlet opening adapted to be communicated hermetically with an isolated environment to be pumped and an exhaust opening spaced vertically from said inlet opening; a plurality of vertically spaced stator blade wheels positioned within said casing intermediate said inlet and exhaust openings thereof; a rotor mounted within said casing on a spindle for rotation therewith on a generally vertical axis, said rotor having a plurality of axially spaced rotor blade wheels interleaved with said stator blade wheels for high vacuum pumping in the free molecule pressure range upon rotation of said rotor at high speeds; drive means to rotate said spindle and rotor at high speeds causing high vacuum pumping in the free molecule pressure range, said spindle being supported for said rotation by a bearing spaced upwardly from the lower end of said spindle; a fluid lubricant passageway within said spindle extending upwardly along the vertical axis thereof from an inlet orifice at said lower end to a position horizontally adjacent said bearing, said passageway being adapted to draw fluid lubricant upwardly therealong by centrifugal action upon rotation of said spindle at said high speeds and having an outlet positioned to direct lubricant therefrom to said bearing; a reservoir of a fluid lubricant for said bearing surrounding said lower end of said spindle, said lower end of said spindle extending into said reservoir to a depth below the normal surface level of fluid lubricant therein with that portion thereof below said normal surface level being free of mechanical support; means to isolate the exterior of said spindle adjacent said lower end from lubricant within said reservoir during rotation of said spindle at said high speeds causing said high vacuum pumping in the free molecule pressure range, whereby rotation of said spindle does not cause turbulence at said lower end of appreciable lubricant; and a nozzle communicating with said reservoir and extending into said inlet orifice to feed fluid lubricant into said passageway without said lubricant having to contact external rotating surfaces of said spindle.

2. A high vacuum turbomolecular pump according to claim 1 wherein fluid lubricant exiting said bearing flows downwardly toward said reservoir under the force of gravity; said drive means for rotating said spindle and rotor is an electric motor having its rotor secured to said spindle intermediate said bearing and said reservoir, and its stator spaced outwardly of said rotor; and further including an annular shield circumscribing and projecting radially outward from said spindle between said bearing and said motor to intercept fluid lubricant flowing downward from said bearing and divert the same from said motor motor and the space between the same and said motor stator.

3. A high vacuum turbomolecular pump according to claim 1 wherein said means isolating the exterior of said spindle adjacent said lower end from lubricant within said reservoir is a cup which surrounds said lower end of said spindle in spaced relationship thereto and extends to a level above said normal surface level of fluid lubricant therein.

4. A high vacuum turbomolecular pump according to claim 3 wherein said nozzle is a tube which extends upward from the bottom of said cup into said inlet orifice, which tube communicates with said reservoir exterior of said cup below said normal surface level of fluid lubricant therein.

5. A high vacuum turbomolecular pump according to claim 1 wherein fluid lubricant exiting said bearing flows downwardly toward said oil reservoir under the force of gravity; and further including a second bearing supporting said spindle spaced below said first recited bearing but above the normal surface level of fluid lubricant within said reservoir and above said free lower end of said spindle, and means for intercepting said downward flow of fluid lubricant prior to the same reaching said reservoir and directing the same to said second bearing for lubrication thereof.

6. A high vacuum turbomolecular pump according to claim 5 wherein said means for intercepting said downward flow of fluid lubricant includes structure defining a cavity for capturing said fluid lubricant and a metering orifice extending from said cavity to said second bearing for directing lubricant captured by said cavity to said second bearing.

7. A high vacuum turbomolecular pump according to claim 6 wherein said means isolating the exterior of said spindle adjacent said lower end from lubricant within said reservoir is a cup which surrounds said lower end of said spindle in spaced relationship thereto and extends to a level above said normal surface level of fluid lubricant therein; and said nozzle is a tube which extends upwardly from the bottom of said cup into said inlet orifice, which tube communicates with said reservoir exterior of said cup below said normal surface level of fluid lubricant therein.

8. A high vacuum turbomolecular pump according to claim 1 wherein the lower end of said spindle includes an inwardly extending flange which defines a circumferential shoulder at such lower end providing support within said spindle adjacent the walls of said passageway for any fluid lubricant therein.

* * * * *